C. CADWELL.
Harvester.
No. 57,082.
Patented Aug. 14, 1866.
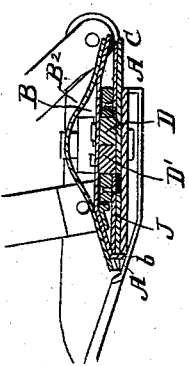
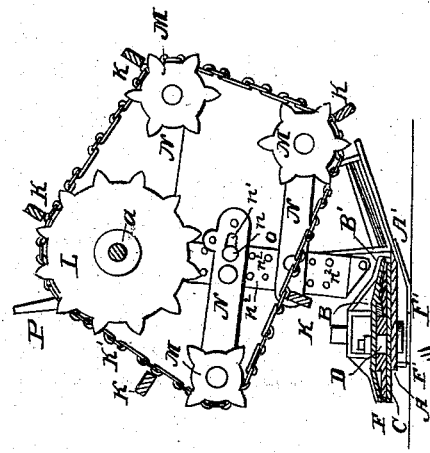
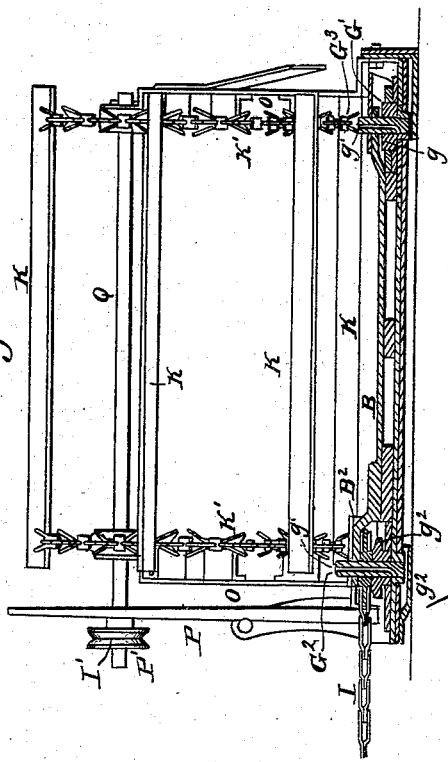
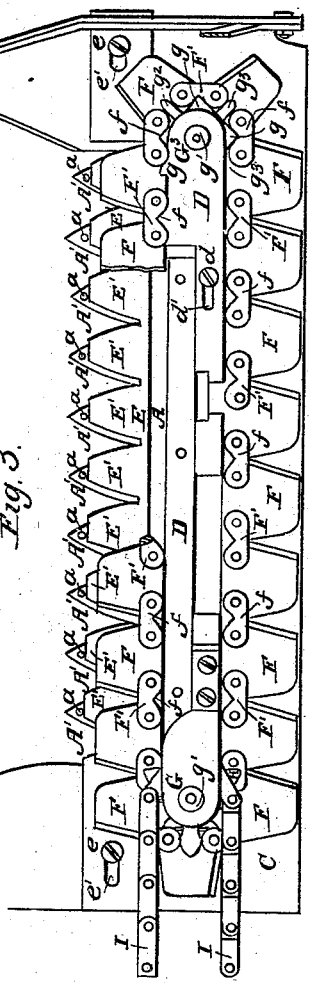
Witnesses:
Inventor:
C. Cadwell
By Munn & Co
Attorney

UNITED STATES PATENT OFFICE.

CALEB CADWELL, OF WAUKEGAN, ILLINOIS.

IMPROVEMENT IN HARVESTERS.

Specification forming part of Letters Patent No. 57,082, dated August 14, 1866.

*To all whom it may concern:*

Be it known that I, CALEB CADWELL, of Waukegan, in the county of Lake and State of Illinois, have invented a new and useful Improvement in Harvesters; and I do hereby declare the following to be a full, clear, and exact description of the nature, construction, and operation of the same, reference being had to the accompanying drawings, which are made part of this specification, and in which—

Figure 1 is a sectional elevation of a gatherer and cutting apparatus constructed upon my improved plan, the plane of section being through the longitudinal center of the cutting apparatus. Fig. 2 is a cross-section of the same. Fig. 3 is a plan of the cutting apparatus with the cap-plate removed. Fig. 4 is a transverse section of the cutting apparatus.

Similar letters of reference indicate corresponding parts in the several figures.

This invention relates, chiefly, to the construction of the cutting apparatus; and it consists of a series of teeth or cutters connected together by means of links of peculiar form, said links being pivoted to the teeth in such a manner as to form in conjunction therewith an endless cutting device, which is made to circulate upon the top of a stationary sickle or cutter bar by means of an endless chain and sprocket-wheels, all constructed and arranged, in combination with their accessory devices, in the manner hereinafter specified.

The invention further relates to a peculiar method of combining and arranging a reel with the cutting apparatus.

In order that others skilled in the art to which my invention appertains may be enabled to fully understand and use the same, I will proceed to describe it in connection with the accompanying drawings.

A represents a finger-beam, having the guards A' formed thereon in the customary manner. In the guards are holes $a$, which receive small downwardly-projecting tongues $b$ on the guards B' of the cap-plate B.

The finger-beam A is to be jointed to the frame of the harvester in any suitable manner, and has a thin plate, C, riveted to its upper side and projecting to the rear, for the purpose of sustaining the knives upon the proper level and protecting them in their movement at the rear side of the cutting apparatus.

The cap-plate B extends over and protects the entire cutting apparatus, and may be held in place by screws or otherwise, so as to be adapted for ready removal to render the inclosed parts accessible.

D D' may represent a central longitudinal guide consisting of two bars or plates, the former, D, of which is stationary, while the latter, D', is adjustable for the purpose to be explained.

E is a stationary cutter-bar, so applied that its teeth E' terminate just behind the apertures $a$ in the guards of the cap-plate. This cutter-bar, as will be seen by reference to Fig. 3, is secured in place by screws $e$ passing through slots $e'$, to admit of the longitudinal adjustment of the bar from time to time as its edges are worn away by constant use.

F are a series of teeth or cutters, formed separately and connected together by links F', which are pivoted to the teeth, as shown in Fig. 3, and thus form an endless cutting apparatus, which is rotated or made to move around the central guide, D D', by means of the sprockets or square rotating blocks G G' or other equivalent devices.

On the shaft $G^2$ of the rotary block G, nearest the frame of the harvester, is a sprocket, H, which is rotated by a chain, I, which has its motion from the main driving mechanism of the harvester. In each of the shafts $G^2$ $G^3$ of the rotary blocks G G' is drilled a vertical aperture, $g'$, extending down to the lower bearing-surface, and adapted to receive a lubricating material, the flow of which is to be regulated by cotton or other analogous substance.

$B^2$ $B^2$ represent curved metallic plates fastened onto the ends, so as to cover and protect the rotating blocks G G'.

J represents a bent plate of metal secured in such position beneath the cap-plate B that the teeth F, in their movement over the cutter-bar E, must pass between J and the guide D D', and thus maintain their proper position for effective action.

The construction of the rotary cutting device is clearly shown in Fig. 3. In each of the links F' is a recess, $f$, which conforms to the corners $g$ of the rotating blocks G G', which, by engaging with the links in the manner represented, prevents slipping and gives a steady and regular motion to the cutting device as it circulates around the guide D D'.

Motion is communicated to the rotating cutters E by the arms $g^2$, which turn with and project from the rotary block G, and work between the links F', similar arms $g^3$ being also attached to the block G'.

As the cutters F move continuously in one direction, they may be provided with cutting-edges at one side only.

The part D' of the central guide constitutes the bearing for the journal $G^3$ of the rotating block G', and this part D', being secured in place by a set-screw, $d$, passing through the slot $d'$, may be adjusted to tighten the circulating cutter as occasion may require.

If preferred, a spring or springs may be applied to the part D', so as to have a tendency to force the block G' outward, and thus take up any slack in the rotating cutting device caused by moving over rough ground.

K K represent the parallel bars of the reel, which are connected together by chains K' K', passing over the large sprockets or pulleys L L and small sprockets M M, the latter being fixed to the arms N N, (see Fig. 2,) which are each attached to an upright, O, by means of the set-screw $n$, which may pass through the slot $n'$ or the holes $n^2$, whereby the arms N and sprockets or pulleys M may be adjusted both vertically and horizontally, so as to diminish or increase the size of the reel, as circumstances may render desirable. The outer upright O is hinged by a pin, $o$, to the outer divider or shoe, and the inner upright O is hinged to the lever P. Thus the reel is capable of a slight vibrating motion forward and backward, as well as sidewise.

The reel is revolved by a band passing around a pulley, P', on the end of a shaft, Q, upon which the sprockets L L are mounted.

Having thus described my invention, what I claim as new herein, and desire to secure by Letters Patent, is—

1. The circulating cutting device consisting of the teeth F and connecting-links F', when constructed as herein described, and employed in combination with the sprockets G G', in the manner and for the purpose set forth.

2. The arrangement of the finger-beam A, cap-plate B, stationary cutter-bar E E', plate C, guide D D', plate J, and cutting device F F', all constructed and operating as herein shown and described.

3. The rotating blocks or sprockets G G' and hollow journals $G^2$ $G^3$, when combined and arranged as and for the purpose herein shown and described.

4. The reel consisting of the parallel arms K, chains K', wheels L M, uprights O, and adjustable arms N, all constructed and arranged in the manner and for the objects specified.

CALEB CADWELL.

Witnesses:
 EDWARD A. BAYRD,
 R. K. COLLS.